Jan. 11, 1944.   F. NALLINGER ET AL   2,338,959
INTERNAL COMBUSTION ENGINE
Filed April 30, 1940
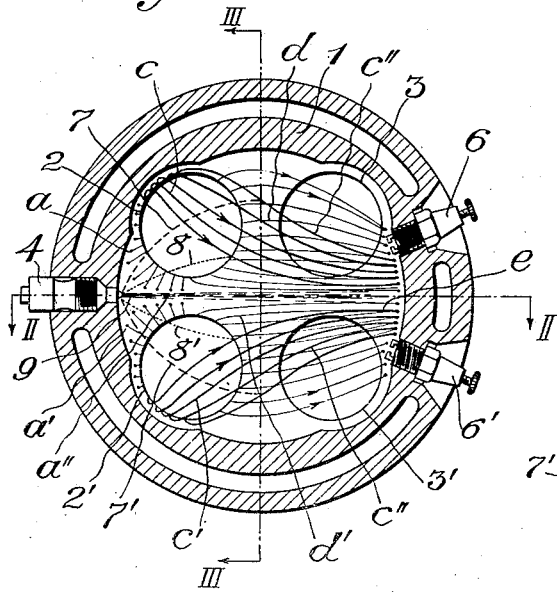
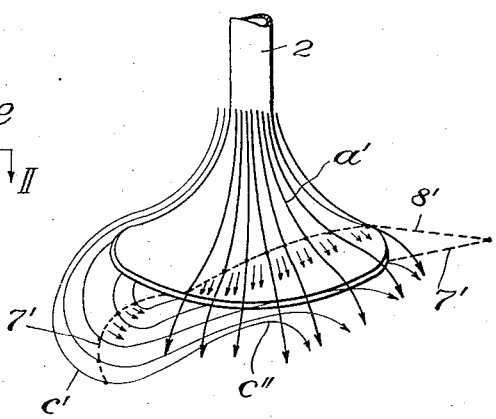
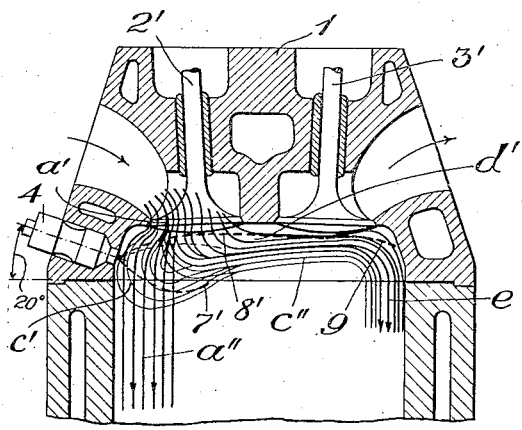
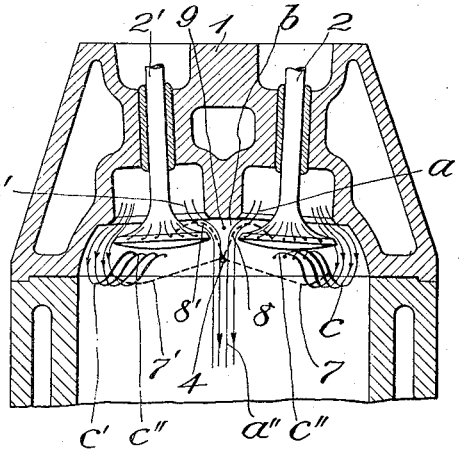
INVENTORS
Fritz Nallinger
BY Wilhelm Glamann
ATTORNEYS Patented Jan. 11, 1944

2,338,959

UNITED STATES PATENT OFFICE 2,338,959

INTERNAL COMBUSTION ENGINE

Fritz Nallinger and Wilhelm Glamann, Stuttgart, Germany; vested in the Alien Property Custodian Application April 30, 1940, Serial No. 332,506
In Germany April 18, 1939

13 Claims. (Cl. 123—191)

This invention refers to a fuel injection type internal combustion engine, particularly one involving the injection of a volatile fuel such as gasoline or the like, in conjunction with ignition by an ignition device, and aims at an improved manner of operation of such engines, specially by means of a most uniform enriching of the combustion air with fuel, which is of great importance for such engines. Above all, the invention utilizes the fact that with a valve governed intake, the air enters the cylinder space in comparatively thin and wide jets or streams having substantially the form of a plane or a band.

In accordance with the above, the invention is directed to an arrangement in connection with an internal combustion engine, particularly of the kind described, wherein the fuel jets are injected in such a manner that they extend substantially within the intake air currents, spreading band- or plane-formed, vertically or slantingly to the streaming direction of the air, seen in a view into this plane.

Experiments have proven that when intake valves are arranged in the cylinder head of an internal combustion engine, essentially two air currents are created across the valve axis or the cylinder axis, one of these currents running above the valve head when open or partially open and the other below the same, the lower one after passing through the valve-gap being deviated about the rim of the valve head. Preferably the fuel is injected across this band-formed air current, entering either across the head of the opened valve into the valve-gap, or below the same into a current-band deviated for instance by the cylinder wall or the like. The scope of the invention permits the application of both ways of injection with one injection spray nozzle.

If, for instance, at the top of the combustion space two disc valves are located next to each other on one cylinder side, preferably opposite to two spark plugs, the fuel will preferably be injected in four jets grouped in pairs, one jet of each pair passing at the inner side of an inlet valve, and another respectively at the outside of the valves. The spray nozzle in this instance is preferably located in the symmetry plane of the spark plugs and valves, and practically below the latter and opposite to the plugs.

In the drawing the invention is shown by way of example in one type, wherein

Fig. 1 shows a cross section through the combustion space of an internal combustion engine working with separate ignition and mixture compression;

Fig. 2 is a longitudinal section through line II—II of Fig. 1;

Fig. 3 is a longitudinal section through line III—III of Fig. 1; and

Fig. 4 shows an inlet valve diagrammatically drawn in a slanting view form above.

In the example given, the cylinder head 1 shows two inlet valves 2, 2' located next to each other in the top of the combustion space. Both valves are placed opposite to two outlet valves 3, 3'. Between the inlet valves 2, 2' a spray nozzle 4, inclined by about 20° downward, discharges, and next to the outlet valves opposite to the spray nozzle with little space between them, two spark plugs 6, 6' are located. Preferably injection is started when the piston performs its sucking action and moves relative to the crank pin 25 to 30° prior to its upper dead centre. At this time both inlet valves are open. Through these the air enters in streaming forms which are the result of a test, and are illustrated by the drawing. Three distinctly different streaming bands are distinguished from each other. First, a certain quantity $a$ (Figs. 1 and 3) of air streams towards the nozzle. But as the two streaming bands, leaving the two valves 2, 2' influence each other, immediately in front of the mouth of the inlet nozzle 4, and between the valve 2, 2' a slowly streaming dead zone $b$ (Fig. 3) remains, below which the two streaming bands $a$ and $a'$ unite to a single steam-band $a''$ (Figs. 2 and 3) in downward direction. A second streaming band, deviated by the proximate cylinder wall adjacent each inlet valve, forms currents $c$, $c'$ below the valve head, which move upward (at $c''$) towards the middle of the cylinder space. With this one unites a third streaming band $d$, $d'$, immediately leaving the inlet passage, forming together with it a strong total current $e$ (Fig. 2) moving across the combustion space and along the top of same. The charging air follows therefore the downward moving piston in two larger air columns $a''$ and $e$. Into these streaming bands of the charging air the fuel is injected preferably in four jets 7, 7' and 8, 8', and in such a manner that it enters the plane of the streaming bands essentially perpendicularly to the streaming direction of the air. Specifically, the two jets 8, 8' which are on the inside relative to the axis of the spray nozzle inject into the streaming bands $a$, $a'$, and two outer jets 7, 7' run across or come in contact with the eddies or stream bands $c$, $c'$. As the fuel jets 7, 7' or 8, 8' lie inside the plane of the streaming band, they are transversally taken hold of and blown away along the streaming band plane. The fuel from the jets 8 and 8', is distributed into the air currents $a''$ and $d$, $d'$, and the fuel from the jets 7, 7' into the air currents $c$, $c'$. The jets 7, 7' require relative to the jets 8, 8' a somewhat higher penetration power because they have partly to penetrate the streaming band $a$ or $a'$. Under some circumstances it may be advantageous to inject the fuel also in a fifth jet 9 (Figs. 1, 2 and 3). This jet which is directed radially and upwardly passing through the slow streaming zone $b$ and between the valves 2, 2', and is finally taken up by the uniting streaming bands $c$, $c'$ in the same direction. This jet cools the section of the combustion space above the nozzles and particularly strongly enriches the section between the spark plugs, as it will not be blown away transversally.

In connection with the described manner of injection, it will be preferable to choose a more than normal intersection between the intake start and, the outlet end which may amount to 60 to 140°, for example about 90° for a four stroke cycle motor, and for two stroke cycle motors about 110 to 160°. In order to avoid fuel losses at such a regulation of the intake and outlet times, it will be practical to inject only after the finished scavenging, i. e., immediately before the closing, at the closing or after the closing of the outlet valve.

The expressions applied here, like "band- or plane-formed charging air currents" or "planes" of these currents are naturally to be understood only symbolically, as they do not exclude certain deviations, if only the nature of the invention will be retained. Thus these air currents may have some more or less large spacious extension. Also the injection of the fuel must not take place exactly in the mentioned plane which essentially means a plane contacting the stream-band in that place where the fuel jet traverses the air current.

Having now described and ascertained the nature of our invention and in what manner the same is to be performed, we declare that what we claim is:

1. In an internal combustion engine having a cylinder space provided with an inlet device for the admission of an air current, said inlet device being of such shape that the substantial part of the charging air currents extend therefrom substantially in the form of bands, and a fuel injecting device having a plurality of jets for injecting fuel into said cylinder space, so positioned and arranged that the fuel jets extend substantially within the plane of the band-formed expanding charging-air currents, and at an angle to the direction of current flow, as seen in the plane of the air currents.

2. In an internal combustion engine having a cylinder space provided with an inlet port for the admission of an air current, an air inlet controlling member in said port of such shape that the substantial part of the charging air currents from said port extend therefrom substantially in the form of bands, and a fuel injecting device having a plurality of jets for injecting fuel into said cylinder space, so positioned and arranged that at least a part of the fuel jets extend substantially within the plane of the band-formed expanding charging-air currents, and at an angle to the direction of air current flow, as seen in the plane of the air currents.

3. In an internal combustion engine having a cylinder space provided with an air inlet port, a disc valve in said port, and a fuel spraying device having a plurality of jets for injecting fuel below and past the valve head and so positioned that at least one fuel jet extends substantially diagonally across the valve in its open position and substantially tangentially to the circumference of the cylinder, over the surface of an air current deviated around the valve, transverse to its direction of flow.

4. In an internal combustion engine having a cylinder space provided with two air inlet ports arranged immediately next to each other, said inlet ports being each provided with a disc valve, and a fuel spraying device provided with a plurality of jets, so arranged between the valves and so formed that it injects the fuel in four jets grouped in pairs, one jet of one pair passing the inner side of one intake valve respectively, located towards the center of the cylinder space, the other jet passing the valve near its outside, the jet of the other pair being similarly positioned with respect to the other valve.

5. In an internal combustion engine having a cylinder space provided with two air inlet ports arranged immediately next to each other, said inlet ports being each provided with a disc valve, a fuel spraying device having a plurality of jets, so arranged and formed that it injects the fuel in four jets grouped in pairs, one jet of one pair passing the inner side of one intake valve respectively, located towards the center of the cylinder space, the other jet passing the valve near its outside, the jet of the other pair being similarly positioned with respect to the other valve, and two spark plugs for igniting the mixture, arranged at the side of the cylinder space opposite to the air intake ports and the spraying nozzle.

6. In an internal combustion engine having a cylinder space provided with two air inlet ports arranged immediately next to each other, said inlet ports each being provided with a disc valve, and a fuel spraying device having a plurality of fuel jets, so arranged that it injects the fuel in four jets grouped in pairs, one jet of one pair being injected above one of the two valve heads, and the other jet of this pair being injected below this valve head respectively, and the one of these jets being directed more towards the inner side of the cylinder space, the other jet more towards the outside of the cylinder space, the jets of the other pair being similarly positioned with respect to the other valve head.

7. In an internal combustion engine, the combination according to claim 6, in which the fuel jet injected above the valve head is directed more towards the inner side, and the fuel jet injected below the valve head is directed more towards the outside of the cylinder space.

8. In an internal combustion engine having a cylinder space provided with two air inlet ports arranged immediately next to each other for the admission of an air current, a disc valve in each of said ports for opening and closing the same, the heads of said valves extending a predetermined distance into said cylinder space when the valves are in their open position, and a fuel spraying device having a plurality of fuel jets so arranged that it injects the fuel in four jets grouped in pairs, two of these jets being injected above the two valve heads into the gaps between the valve heads and their respective inlet ports when the valves are in their open position, and two of the jets being injected below the valve head.

9. The combination according to claim 6, in combination with two spark plugs positioned within said cylinder on the side opposite to said valve and said fuel spraying device.

10. The combination according to claim 5, in which said fuel spraying device has a fifth jet directing fuel across the cylinder space into the space between said spark plugs.

11. In an internal combustion engine having a cylinder space provided with an inlet port for the admission of an air current, a disc valve in said port for opening and closing the same, the head of said valve extending a predetermined distance into said cylinder space when the valve is in its open position, and a fuel injection device having a plurality of jets for injecting fuel in such a manner that at least one fuel jet extends across the valve head into the gap between the valve head and the inlet port when the valve is in its open position, and all of said fuel jets extend substantially within the plane of the band-shaped expanding charging air current.

12. In an internal combustion engine having a cylinder space provided with an air inlet port for the admission of an air current, a disc valve in said port for opening and closing the same, the head of said valve extending a predetermined distance into said cylinder space when the valve is in its open position, and a fuel spraying device, having a plurality of jets for injecting the fuel in such a manner that at least one fuel jet extends above the valve head to the gap between the valve head and the inlet port when the valve is in its open position, and at least one fuel jet extends below the valve head.

13. The combination according to claim 8, in combination with two spark plugs positioned in said cylinder space on the side opposite said valve and fuel spraying device.

FRITZ NALLINGER.
WILHELM GLAMANN.